3,151,602
DUAL PISTON INTERNAL COMBUSTION POWER UNIT
Curtis McClellan Phillips, Rudyard, Mont.
Filed Jan. 4, 1962, Ser. No. 165,274
2 Claims. (Cl. 123—47)

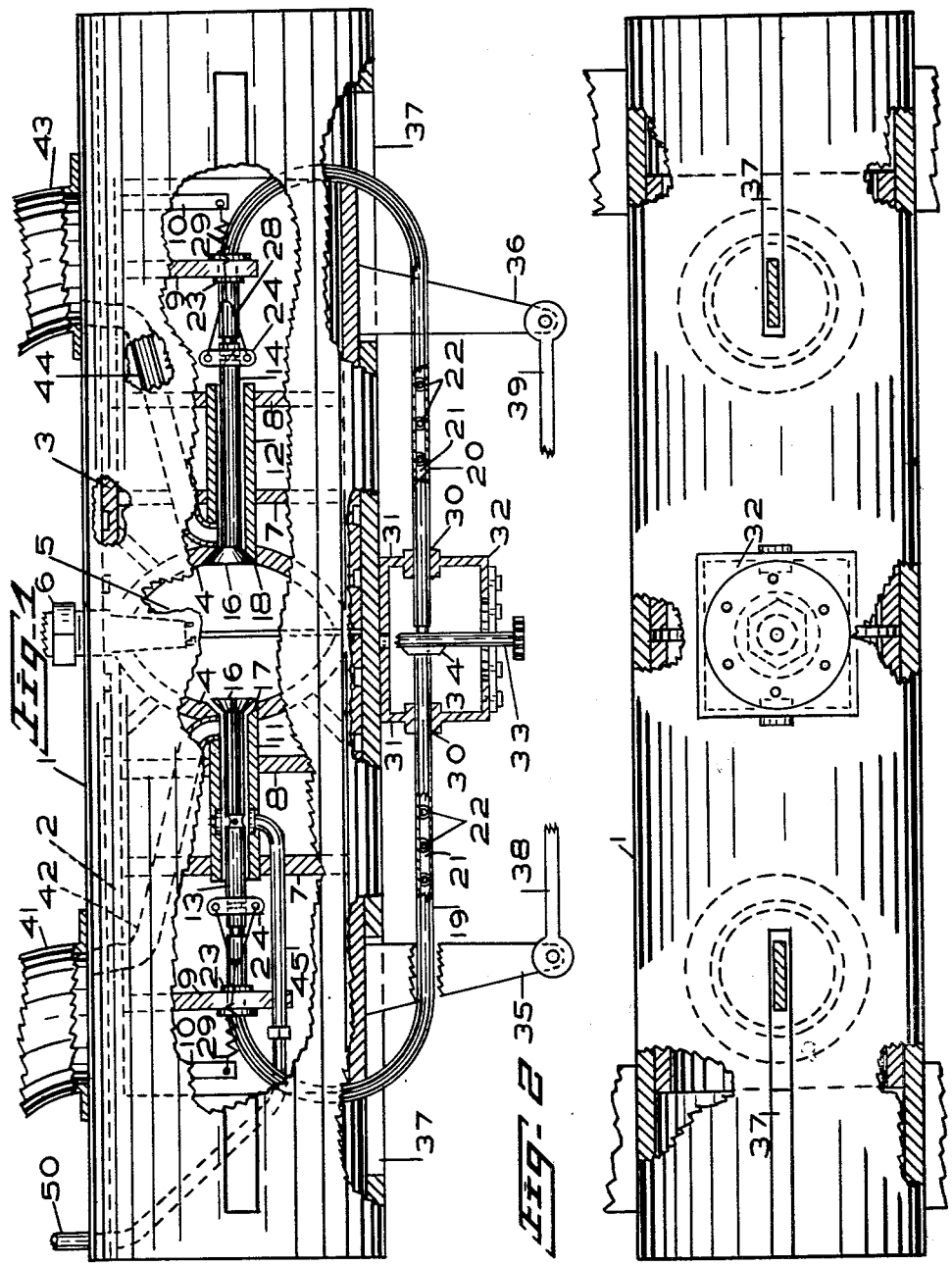

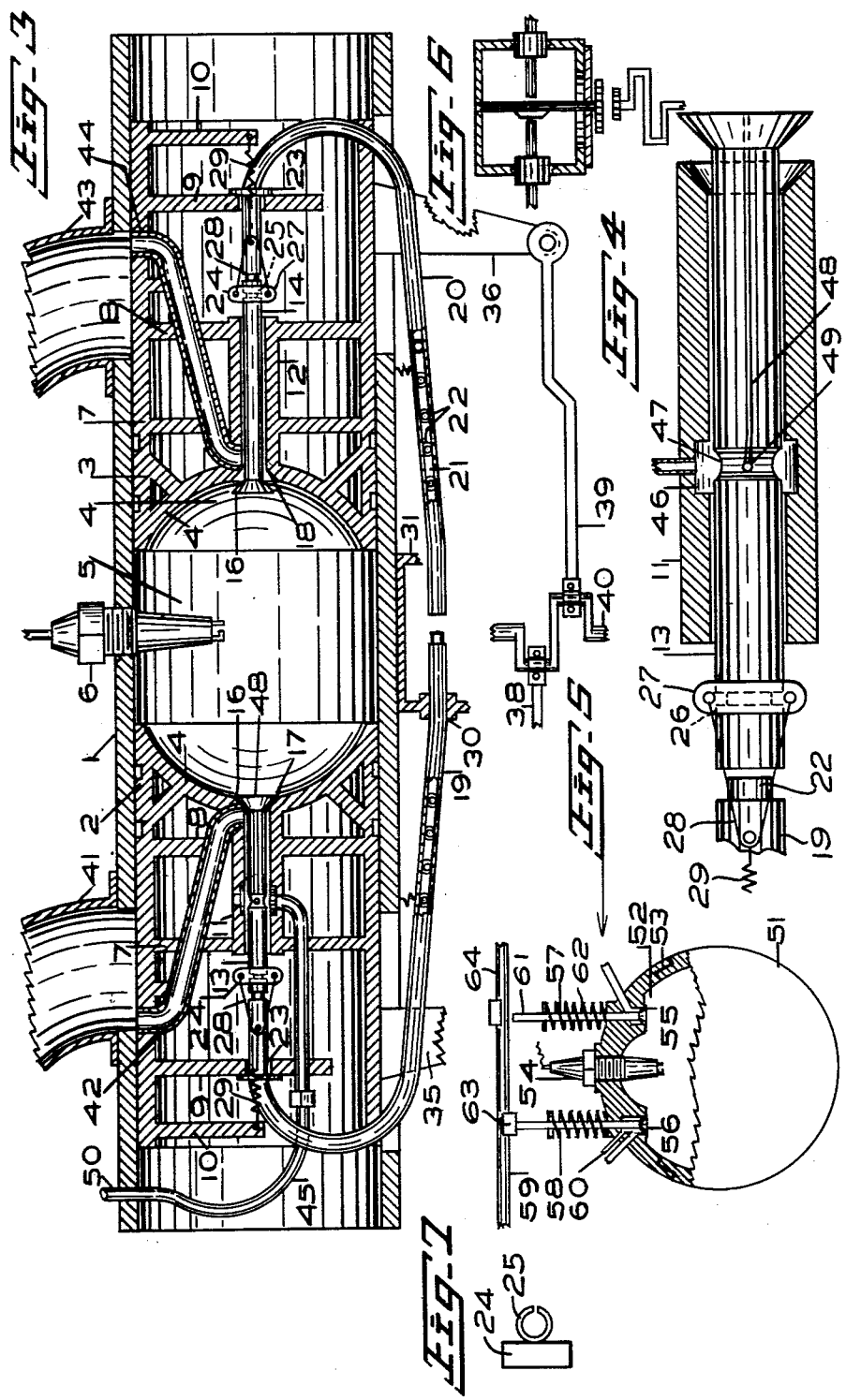

This invention relates to internal combustion power units, having particular reference to a device of this character using a pair of pistons operating in a common cylinder and with a single combustion chamber for the two pistons.

In the art to which the invention relates, the use of a pair of pistons operating in a common cylinder in end to end relationship to each other has been proposed, and it is with power units of this character that the device as shown herein is concerned.

One of the objects of the invention is accordingly to provide an improved dual cylinder power unit in which opposing pistons operating in the cylinder are used, and to simplify and improve the valve system and its operation for fuel and scavenging air injection and for exhaust of the waste gases. There are further provided improved pistons, and an improved combustion chamber and power take off.

Other features and advantages of the invention will become apparent by reference to the accompanying description taken in conjunction with the drawings.

In the drawings, wherein is illustrated a preferred embodiment of the invention, FIG. 1 is a side view, largely in vertical section, of a power unit in accordance with my invention, illustrating the position of the pistons in advance of the power stroke, parts being shown as broken away.

FIG. 2 is an inverted plan view of the unit, shown with parts broken away and partly in section.

FIG. 3 is a side view, largely in vertical section, of the power unit, shown with the pistons as they would appear at the completion of a power stroke, with parts shown broken away.

FIG. 4 is an enlarged side view of a valve sleeve and valve mounted therein, shown with the sleeve in vertical section.

FIG. 5 shows an end view, partly in section, of a combustion chamber showing another arrangement of the fuel inlet and exhaust pipes, including a cam shaft and valves.

FIG. 6 is a side view, largely in section, showing the cam casing and including fragments of the push rod pipes, and further including a fragment of the crank shaft.

FIG. 7 is an enlarged view of the valve stem clamping element and bracket.

Having reference to the drawings, a cylinder 1 has mounted therein for reciprocation a pair of pistons 2 and 3, the pistons having concavely surfaced heads 4 defining between them a combustion chamber 5 when the pistons are in position for the power stroke. A spark plug 6 is mounted in the cylinder projecting into the combustion chamber with the firing points of the spark plug at or near the center of the chamber.

Each of the pistons includes forward plates 7 and 8 formed integral therewith transversely of the pistons, and rearward partial plates 9 and 10 integral with and projecting inward of the cylinder. In the forward plates are mounted valve guide sleeves 11 and 12 in which valve stems 13 and 14 are endwise slidable, the stems including heads 16, and the piston heads 4 having openings at 17 and 18 forming seats for the valve heads. The valve heads, as illustrated, are slightly unseated to disclose the piston head openings.

The valve stems 13 and 14 are engageable by push rods formed of ball and socket elements, indicated at 22 and 21, which as a unit may bend resiliently and at the same time be stffi enough to impart movement to the valves, the push rods mounting in pipes 19 and 20 that are carried in sleeves 23 in the piston plates 9.

For attachment of the valve stems anchored in the pistons but movable by the push rods for unseating the valves, brackets 24 (FIG. 3) are mounted on the valve stems (FIGS. 1 and 3) the brackets having annular lugs 25 engaging grooves 26 (FIG. 4) in the valve stems. The brackets include wings 27 to which the ends of which attach wire loops 28 forming links engaging hooked ends 29' of springs 29. The other ends of the springs are anchored to the piston plates 10.

The pipes 19 and 20 have their other ends carried slidable in suitable openings at 30 in plates 31 of a cam casing 32 attached fixed on the cylinder 1 and in which is mounted to rotate a cam shaft 33 which cam 34 for engagement of the inner ends of the push rods to alternately move the push and push the valve stems 13 and 14 inward to unseat the valve heads 16, this movement of the valve stems pulling on the springs 29, the springs being tensioned to normally hold the valve stems with their heads seated in the openings 17 and 18 of the piston heads 4.

The pistons 2 and 3 have arms 35 and 36 fixed thereto and projecting through longitudinal slots 37 in the cylinder wall by which endwise movement of the pistons within the cylinders is permitted. The arms 35 and 36 attach by connecting rods 38 and 39 to the cranks of a crank shaft 40 from which the cam shaft 33 would be driven, the driving connections for which are omitted.

There is also an exhaust port 41 to which a pipe 42 leads from the valve guide sleeve 11 at the opening 17 in the head 4 of the piston 2, and a fuel inlet port 43 from which a pipe 44 leads to the valve guide sleeve 12 at the opening 18 in the head 4 of the piston 3.

For scavenging, a pipe 45 is mounted in the plate 9 of the piston 2 and leads to the guide sleeve 11 discharging into an annular recess 46 (FIG. 4) in the sleeve and with which an annular groove 47 in the valve stem is adapted to register when the head 16 of the valve stem is unseated from the opening 17 in the piston head 4. The valve stem 13 has a bore, as at 48, to which the groove 47 communicates by an inlet 49. The pipe 45 would be connectable, as by a pipe extension 50, to a source of supply of air under pressure.

In the use of the power unit, a charge injected into the combustion chamber 5 through the fuel inlet pipe 44, and ignited with the power unit as in FIGURE 1, that is with the pistons moved inward, the ignited charge would move the pistons outward, and this, by the arms 35 and 36 and the connecting rods 38 and 39 turns the crank shaft 40. The crank shaft would be connected, as is common in the art, to turn the cam shaft 33, which by the cam 34 would move the push rod in the pipe 19 and by it the valve stem 13 is moved to unseat its valve head 16 and allow the exhaust gases to escape through the pipe 42. This movement of the valve stem, subsequent to the initial escape of the waste gases brings the recess 47 into register with the recess 46 (FIG. 4) and the opening 49 in the valve stem allowing air under pressure to discharge into the combustion chamber through the bore 48 for driving the residue of the burnt gases out of the combustion chamber through the pipe 42. Continued movement of the cam shaft releases the rod 19 allowing the spring 29 to move the valve stem 13 outward and seat its valve head 16 in the opening 17.

As the cam shaft continues to turn it next moves the push rod in the pipe 20 to shift the valve stem 14 inward and unseat its valve head 16 from the opening 18, allowing fuel to enter through the inlet port 43 and pipe 44, which fuel is then compressed by the inward movement of the pistons and fired at the conclusion of the compression stroke.

In FIGURE 5 is shown another arrangement of inlet and exhaust ports for the combustion chamber. In this showing the numeral 51 indicates the cylinder, which includes an open upper side 52 closed by a removable cylinder section 53 in which is mounted a spark plug 54. At 55 and 56 are intake and exhaust ports closed by valve 57 and 58 mounted on valve stems 61 and held normally closed by springs 62. The valve stems would be actuated by cams 63 on a cam shaft 64.

Having thus particularly set out and ascertained the nature of my said invention, what I claim and wish to secure by Letters Patent is:

1. In an internal combustion power unit having a cylinder and opposing pistons mounted for reciprocation therein, and a crank shaft connected to be turned by the pistons, and including valve guide sleeves axially mounted in the pistons and valves having stems endwise slidable in the sleeves, the pistons having valve seat openings in the opposing ends thereof, spring means anchored in the pistons normally holding the valves seated in said openings, and means for moving the valve stems for unseating said valves, said means including a cam casing, a cam shaft mounted in the casing connectable to be driven from the crank shaft, a curved pipe for each piston fixed therein with the piston ends of the pipes in opposing relation to the valve stem, the cam casing having openings therein in which the other ends of said pipes are carried slidable in opposing relation to the cam shaft, the cylinder having openings through which said pipes extend and are movable, and flexible push rods in the pipes alternately movable endwise therein by the cam shaft to unseat the valves.

2. In a dual piston engine as set out in claim 1 and in which one of the valve sleeves is connected to an exhaust port for discharge of the waste gases, and including a pipe connectable for supplying air under pressure for scavenging, means by which air from said pipe is injected into the combustion chamber, said means comprising connecting the outlet from the air supply pipe discharging into the valve sleeve intermediate the length of said sleeve, the valve stem in said sleeve having an annular recess therein and a bore connected to said recess through an opening between the recess and bore, said bore having an outlet in the valve head, and said recess and bore and the opening therebetween forming a passage from the air supply pipe to the combustion chamber when the valve stem is moved to bring the annular recess into register with the outlet from said air supply pipe.

References Cited in the file of this patent
UNITED STATES PATENTS

| | | |
|---|---|---|
| 581,421 | Capitaine | Apr. 27, 1897 |
| 1,213,315 | Well | Jan. 23, 1917 |
| 1,729,849 | Willgoos | Oct. 1, 1929 |
| 1,972,409 | Petersen | Sept. 4, 1934 |
| 2,166,211 | Gray | July 18, 1939 |
| 2,360,600 | Vrana | Oct. 17, 1944 |
| 2,819,704 | Niederman | Jan. 14, 1958 |